March 10, 1936.  T. W. JOHNSON  2,033,380
TRACTOR SUPPORTED IMPLEMENT ATTACHMENT
Filed Oct. 1, 1934
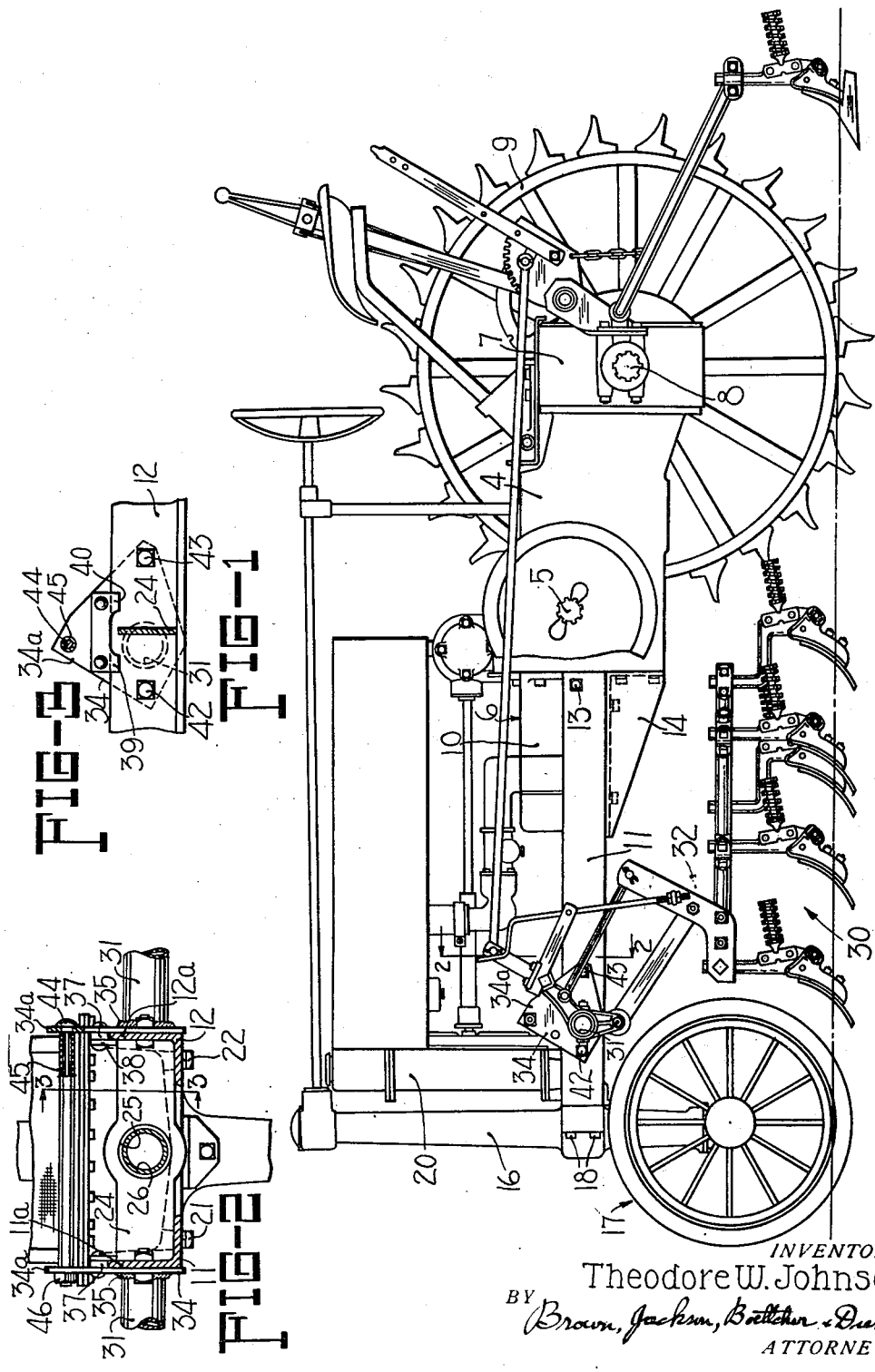
INVENTOR.
Theodore W. Johnson.
BY
ATTORNEYS.

Patented Mar. 10, 1936

2,033,380

UNITED STATES PATENT OFFICE 2,033,380

TRACTOR SUPPORTED IMPLEMENT ATTACHMENT

Theodore W. Johnson, Moline, Ill., assignor to Deere & Company, Moline, Ill., a corporation of Illinois Application October 1, 1934, Serial No. 746,281

15 Claims. (Cl. 97—47)

The present invention relates generally to tractor supported implement attachments and other attachable and detachable units adapted to be carried by a supporting frame or the like, and the principal object of the present invention is to provide an improved connection between such an attachment and the machine upon which it is carried. Principally, the present invention takes the form of an improved connection between an implement attachment and a tractor whereby the implement may be more easily connected to the tractor. In this connection, a further object of the present invention is the provision of such connections that the implement can be attached by one man, thus eliminating any necessity for the employment of other persons in the operation of attaching the implement unit to the tractor.

In order to best illustrate the principles of the present invention, I have illustrated the same as applied to a cultivator which comprises two sections, one connected to each side of the tractor, since my invention is particularly adapted for implements which comprise two such sections, each usually having a laterally extending frame member. It is to be understood, of course, that my invention is not to be limited to cultivator attachments or similar implements.

A further object of the present invention is to provide the tractor or other supporting machine with a substantially flat surface on each side terminating in a ledge adjacent the upper portion thereof, and to provide the draft members of the cultivator attachment with plates at their inner ends carrying or formed with bracket means adapted to hook over or embrace the upper edges or ledges with the plates bearing against the flat surfaces. In many tractors, the frame thereof usually includes at least one longitudinally extending frame member or rail, and in some cases, these rails may take the form of angle irons. Also, this portion of the tractor frame is usually disposed adjacent the forward end thereof where it is generally customary to mount implement attachments of various sorts.

A still further object of the present invention is the provision of such connecting means for detachable implement units and the like that the unit to be attached can be hooked over the upper edge of one of the tractor frame members in approximate position and can then be shifted one way or the other to bring the attachment to the proper position, and it is a further object of the present invention to arrange such connections so that the operator can perform these operations without any help.

A still further object of the present invention is to arrange reenforcing means for such connections so that all danger of distorting the tractor frame by the weight of the attachments themselves is eliminated.

These and other objects and advantages of the present invention will be apparent to those skilled in the art after a consideration of the following detailed description of the preferred embodiment, taken in conjunction with the accompanying drawing illustrating such embodiment.

In the drawing:

Figure 1 is a side view of a tractor and an associated cultivator attachment in which the principles of the present invention have been embodied;

Figure 2 is an enlarged sectional view, taken approximately along the line 2—2 of Figure 1; and Figure 3 is a section taken along the line 3—3 of Figure 2.

Referring now more particularly to Figure 1, the tractor chosen to illustrate the present invention comprises a main frame casting 4 in which the crank shaft 5 of the tractor motor, indicated in its entirety by the reference numeral 6, is journaled. The main frame casting 4, in the illustrated embodiment, serves as a housing in which the transmission and differential of the tractor are mounted, and to the rear end of the main frame casting 4 the rear axle housing 7 is secured, as by bolts or the like. Drive axles 8 are supported in the axle housing 7, and on the outer ends of the axles 8 drive wheels 9 are connected in the usual manner. The tractor motor 6 includes a cylinder block 10 bolted over the forward end of the frame casting 4, and projecting forwardly from the cylinder block 10 and fixed thereto are two transversely spaced frame members or rails 11 and 12 (Figure 2). Preferably, these rails are formed of angle iron and include vertical flanges 11a and 12a. The rear ends of the rails 11 and 12 are secured to the cylinder block 10 and main frame casting 4 in any suitable manner, as by bolts 13 or the like, and in order to brace and reenforce the connection between the rails 11 and the casting 4, a triangular brace member 14 is connected between the rear end of each rail and the frame casting 4, as best shown in Figure 1.

The tractor also includes a vertical steering column 16 in which a front wheel truck 17 is journaled for rotation about a generally vertical axis. The steering column 16 is securely fastened by bolts 18 to the forward ends of the frame members 11 and 12. Rearwardly of the steering column 16 is a radiator 20 which rests between the frame rails 11 and 12 adjacent their forward ends. The radiator is connected to the rails 11 and 12 by any suitable means, such as bolts 21 and 22. Rearwardly of the radiator 20 the two rails 11 and 12 are braced and securely connected together by means of a cross-brace or transverse frame member 24, the ends of the latter being welded to the two longitudinally disposed frame members 11 and 12, as best indicated in Figure 2. The brace member 24 is provided with a hole 25 in its central portion, and through this opening the hose connection 26 between the radiator 20 and the cylinder block 10 is extended.

As mentioned above, I have chosen to illustrate the principles of the present invention as embodied in an implement for the tractor in the nature of a pair of cultivator units. The unit at one side of the tractor is substantially the same as the unit at the other side, and hence a description of one of the units will be sufficient. Preferably, the implement attachment unit takes the form of a cultivator 30, the two sections of which are adapted to be connected to the tractor on opposite sides thereof. Each cultivator section comprises a laterally extending draft member 31 in the form of a pipe or similar supporting member to which one or more cultivator rigs 32 are connected in any suitable manner. Each cultivator section is connected with the tractor by means of the vertically disposed plate 34 which is welded to the inner end of the draft member 31 for that section, as indicated at 35 in Figure 2.

Referring now more particularly to Figure 2, it will be seen that each plate 34 carries bracket means which is adapted to engage or hook over the upper edge of the vertical flange, 11a or 12a, of the associated frame rail 11 or 12. As illustrated, such bracket means preferably takes the form of a spacer 37 of a thickness substantially equal to or slightly greater than the thickness of the vertical flange of the associated rail, and a clip 38 provided with two downwardly extending lugs 39 and 40. Other bracket means may, of course, be provided, such as portions of the plate 34 bent over and downwardly to engage the associated frame rail in the same manner as the spacer 37 and the clips 38 shown in Letters Patent No. 1,980,470, issued November 13, 1934, to Theophilus Brown, which discloses this feature of my invention.

When the implement 30 is connected to the tractor, the plates 34 of the two units bear against the outer faces of the vertical flanges 11a and 12a of the angle irons which comprise the frame rails 11 and 12. The spacers 37 rest upon the upper edge of the vertical flanges, and the lugs 39 and 40 extend downwardly into contact with the inner faces of the vertical flanges. To complete the attachment of the unit to the tractor, a pair of holes are provided in each plate 34, one on each side of the frame member, and holes to be aligned therewith are provided in the rails 11 and 12. Thus, when the implement unit is in its proper position, securing means, such as bolts 42 and 43, adapted to be inserted in the registering holes are tightened to secure the attachment in place. If desired, a plurality of holes may be provided in the rails 11 and 12 to permit the fastening of the attachment in any one of several locations on the tractor.

The principal advantage of this form of attachment resides in the ease with which the implement units may be connected to the tractor. By reason of the provision of the bracket means which embrace the rails on the tractor frame, the operator needs merely to hook the two sections of the implement over the upper edge of the rails on opposite sides of the tractor and then slide each section forwardly or rearwardly until the holes in the plates and in the rails are in alignment. The holes in the rails and in the plates are automatically aligned with respect to their vertical positions when the attachment sections are hooked upon the rails. The alignment of the holes fore and aft is obtained by sliding the implement attachment fore and aft. This is a relatively simple task inasmuch as it is not necessary for the operator to support the whole weight of the implement attachment to shift it along the rails of the tractor. This form of attachment makes it possible for one man to apply the attachment.

From Figure 3 it will be observed that the lugs 39 and 40 are preferably disposed on opposite sides of the cross-brace 24, and hence any tendency for the weight of the overhanging implement units to spring the tractor rails 11 and 12 laterally outwardly along their upper edges is resisted by the cross-brace 24 acting in tension. In order to further reenforce the parts, the two attaching plates 34 are extended upwardly, as at 34a, above the upper edges of the rails 11 and 12, and these upper portions are connected together by means of a long bolt 44 or the like which is extended through perforations in the upper portions 34a. The bolt preferably passes through a pipe or sleeve 45 disposed between said upper portions to serve as a spacing member therefor and bearing against the inner sides of the plates 34. The bolt 44 includes a head at one end and a nut 46 threaded on the other end thereof. When the bolt 44 is tightened the weight of the overhanging tools of the implement unit at one side counter-balances the weight of the overhanging tools at the other side.

While I have shown and described the preferred embodiment of my invention, it will be apparent that my invention is not to be limited to the particular details shown and described, but that, in fact, widely different means may be employed in the practice of the broader aspects of my invention.

What I claim, therefore, and desire to secure by Letters Patent is:

1. The combination with a tractor having a frame including side members, of an attachment comprising a generally laterally extending supporting member, and a plate member adapted to extend fore and aft of and secured to said supporting member at substantially right angles and having means adapted to engage over the upper edge of one of said side frame members.

2. The combination with a tractor having a frame comprising a pair of laterally spaced longitudinally extending members, of a generally laterally extending supporting bar, a plate member rigidly secured to the inner end of said bar and having portions disposed both fore and aft thereof and means arranged to hook over the upper edge of one of said longitudinally extending frame members to support said laterally extending member thereon, whereby said laterally extending member is movable along the longitudinally extending frame member, and means connected with said fore and aft plate portions for securing said plate member against the side of said longitudinally extending frame member.

3. The combination with a tractor having a generally longitudinally extending vertically disposed frame member, of a generally laterally disposed supporting bar and a connecting plate member secured to the inner end of said supporting bar and including portions extending forwardly and rearwardly of the latter, carrying means serving as hooks for engaging over the upper edge of the frame member to support said bar thereon, and bolt means passing through said forwardly and rearwardly extended plate portions and disposed both fore and aft of and in the same horizontal plane as said bar for connecting said bar to the tractor in draft transmitting relation.

4. The combination with a tractor having a generally longitudinally extending vertically disposed frame member, of a generally laterally disposed supporting bar and a connecting plate member secured to the inner end of said supporting bar and carrying means serving as a pair of hooks for engaging over the upper edge of the frame member and spaced longitudinally thereof to support said bar thereon and providing for fore and aft movement of said bar relative to the tractor to facilitate mounting said supporting bar in position, and means also spaced longitudinally and disposed on either side of said bar for securing said plate member to the frame member in draft transmitting relation.

5. The combination with a tractor comprising a frame having a surface on one side terminating in a ledge at its upper portion, of an implement attachment comprising a laterally extending draft member, a plate fixed to the inner end of said member and bearing against said surface, and means serving as bracket members fixed to said plate and disposed to embrace said ledge and bear thereupon while supporting the laterally extending draft member on the tractor frame.

6. The combination with a tractor comprising a frame having a surface on one side terminating in a ledge at its upper portion, of an implement attachment comprising a laterally extending draft member, a plate fixed to the inner end of said member and bearing against said surface, bracket means fixed to said plate and disposed to embrace said ledge and bear thereupon, and means for securing said plate to said surface.

7. The combination with a tractor having a frame comprising a longitudinally extending rail having a substantially flat surface on one side, of an implement attachment comprising a laterally extending draft member, a plate fixed to the inner end of said member and bearing against said surface, bracket means comprising a spacer having a thickness approximately equal to the thickness of said rail, and a clip extending below said spacer so as to embrace said ledge, said clip and spacer being rigidly secured to said plate.

8. The combination with a tractor having a frame comprising a pair of laterally spaced longitudinally extending rails, of an attachment comprising two sections disposed on opposite sides of the tractor, each section comprising a laterally extending draft member, a plate fixed to the inner end of said member and bearing against the outer face of one of said rails, bracket means carried by said plate and disposed to embrace the upper edge of the rail and bear thereupon, and bolts extending through aligned holes in said plate and the rail to secure the section to the rail, and means connecting the upper portions of the plates of the two sections.

9. The combination with a tractor having a frame comprising a pair of laterally spaced longitudinally extending rails, of an attachment comprising two sections disposed on opposite sides of the tractor, each section comprising a laterally extending draft member, a plate fixed to the inner end of said member and bearing against the outer face of one of said rails, bracket means fixed to said plate and disposed to embrace the upper edge of the rail and bear thereupon, and bolts extending through aligned holes in said plate and the rail to secure the section to the rail, and detachable means connecting the plates of the two sections.

10. The combination with a tractor having a frame comprising a pair of laterally spaced longitudinally extending rails, of an attachment comprising two sections disposed on opposite sides of the tractor, each section comprising a laterally extending draft member, a plate fixed to the inner end of said member and bearing against the outer face of one of said rails, bracket means carried by said plate and disposed to embrace the upper edge of the rail and bear thereupon, and bolts extending through aligned holes in said plate and the rail to secure the section to the rail, said plates extending above said bracket means, and detachable means connecting said upwardly extended portions of the plates of the two sections.

11. The combination with a tractor having a frame comprising a pair of laterally spaced longitudinally extending rails, of an attachment comprising two sections disposed on opposite sides of the tractor, each section comprising a laterally extending draft member, a plate fixed to the inner end of said member and bearing against the outer face of one of said rails, bracket means carried by said plate and disposed to embrace the upper edge of the rail and bear thereupon, bolts extending through aligned holes in said plate and the rail to secure the section to the rail, and a cross-brace extending between and connecting said laterally spaced frame rails and serving to reenforce them against stresses incident to supporting said laterally extending draft members.

12. The combination with a tractor having a frame comprising a pair of laterally spaced longitudinally extending rails and a cross-brace connecting said rails adjacent the front ends thereof, of an attachment comprising two sections disposed on opposite sides of the tractor, each section comprising a laterally extending draft member, a plate fixed to the inner end of said member and bearing against the outer face of one of said rails, and bracket means carried by said plate and disposed to embrace the upper edge of the rail and bear thereupon, said bracket means including downwardly extending lugs, one disposed on either side of said cross-brace.

13. The combination with a tractor having a frame comprising a pair of laterally spaced longitudinally extending rails and a cross-brace connecting said rails adjacent the front ends thereof, of an attachment comprising two sections disposed on opposite sides of the tractor, each section comprising a laterally extending draft member, a plate fixed to the inner end of said member and bearing against the outer face of one of said rails, bracket means carried by said plate and disposed to embrace the upper edge of the rail and bear thereupon, said bracket means including downwardly extending lugs, one disposed on either side of said cross-brace, and a pair of bolts, one on each side of said cross-brace, extending through aligned holes in said plates and the rail below said bracket means to secure the section to the rail, portions of each of said plates extending above the associated bracket means, a spacing sleeve disposed between said upwardly extended portions, and tension means connecting said upwardly extended portions of said plates, said means being disposed within and serving to hold the upper portions of said plates against said spacing sleeve.

14. The combination with a tractor having a frame comprising a pair of laterally spaced longitudinally extending rails adjacent its front end, a motor supported by said frame, and a radiator carried on said rails, of an attachment comprising two sections disposed on opposite sides of the tractor, each section comprising a laterally extending draft member, a plate fixed to the inner end of said member and bearing against the outer face of one of said rails, bracket means carried by said plate and disposed to embrace the upper edge of the rail and bear thereupon, a transverse brace member rigidly secured to said laterally spaced rails adjacent the points at which said bracket means engage said rails, means securing said plates to the associated rails in position thereon, said transverse brace having an opening therein, and a radiator connection from the radiator to said motor and disposed in the opening in said transverse brace.

15. The combination with a tractor having a frame including a side member, of a generally laterally extending supporting member and an attaching member having portions adapted to extend generally fore and aft of the tractor against said side member and secured to said supporting member at substantially right angles thereto, said attaching member having means adapted to engage over the upper edge of said side frame member.

THEODORE W. JOHNSON.